June 1, 1937. C. CHRISTOFFERSON 2,082,481
AIR FILTER FOR VENTILATING SYSTEMS OR APPARATUS
Filed April 6, 1936 2 Sheets-Sheet 2
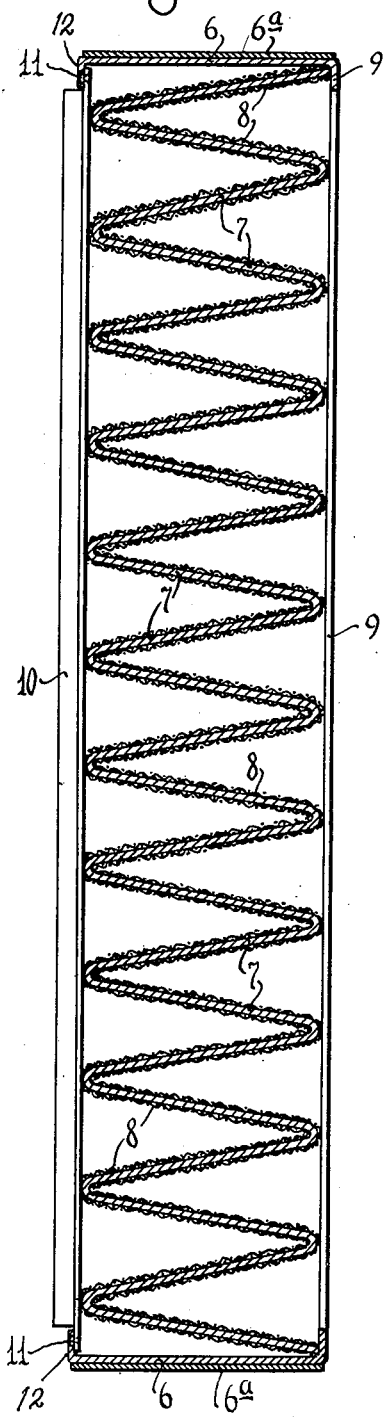
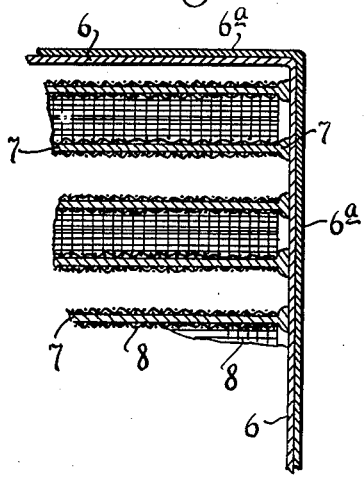
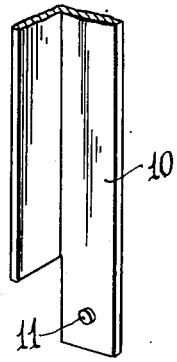
INVENTOR
Charles Christofferson
BY HIS ATTORNEYS Patented June 1, 1937

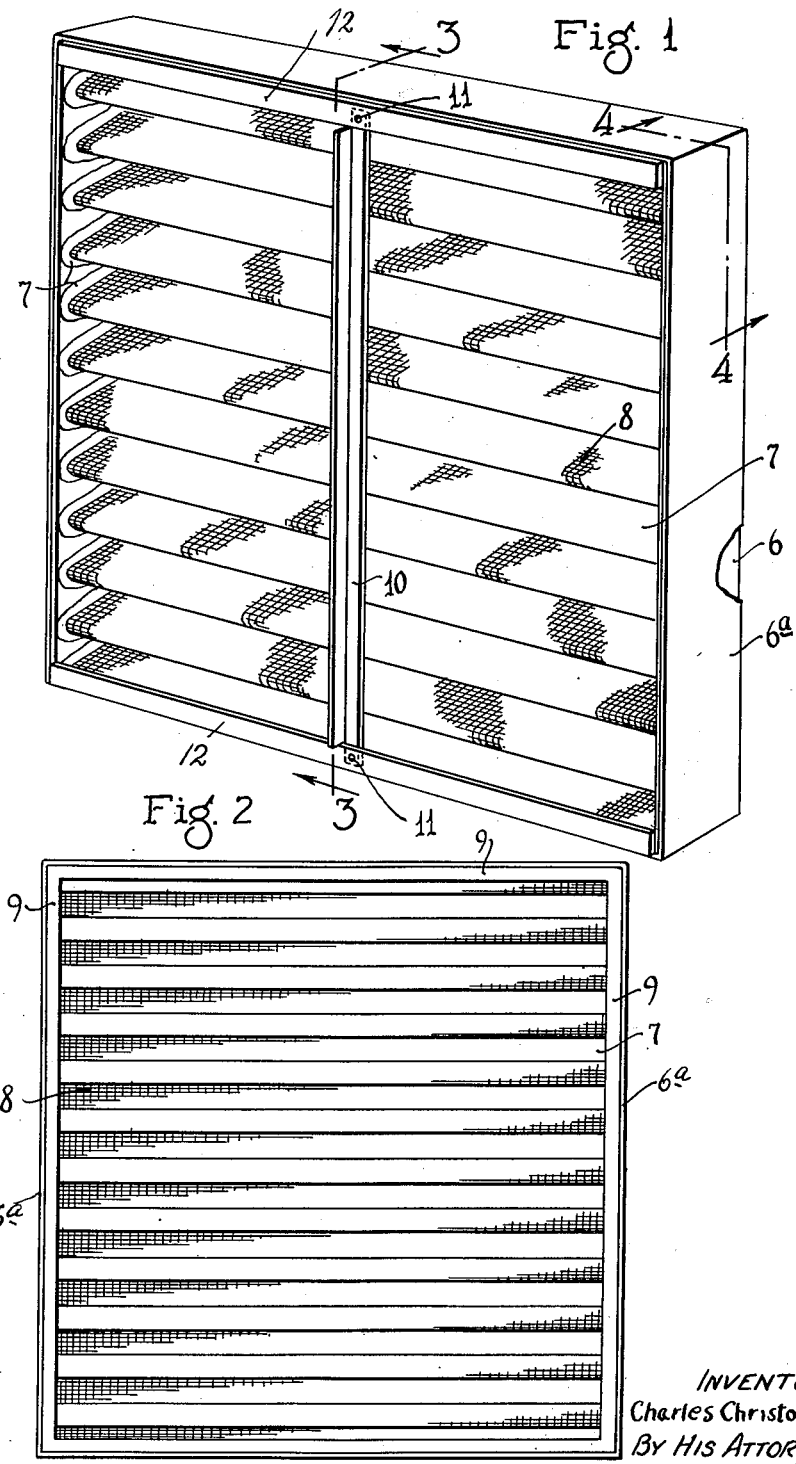

2,082,481

UNITED STATES PATENT OFFICE 2,082,481

AIR FILTER FOR VENTILATING SYSTEMS OR APPARATUS

Charles Christofferson, Duluth, Minn., assignor to Universal Air Filter Corporation, Duluth, Minn., a corporation of Minnesota Application April 6, 1936, Serial No. 72,874

2 Claims. (Cl. 183—71)

My present invention relates to air filters for ventilating systems or apparatus which employ one or more units for filtering or taking dust and other impurities from the air. The objects of the invention, generally stated, are simplicity and low cost of construction, efficiency in action, and ease of replacement of the complete units or of the filtering media proper of the complete unit. The present invention is in the nature of an improvement on or modification of the air filters disclosed and claimed in my prior Patents, Nos. 1,862,659 of June 14, 1932; 1,982,639 of December 4, 1934; and 2,016,033 of October 1, 1935.

Generally stated, the invention consists of the novel devices, combinations of devices and arrangement of parts hereinafter described and defined in the claims. A commercial form of the improved filter is illustrated in the accompanying drawings wherein like characters indicate like parts throughout the several views.

Referring to the drawings:

Fig. 1 is a perspective showing the complete air filtering units looking at the rear or back side thereof;

Fig. 2 is an elevation of the filtering units looking at the front face or side thereof, that is a side against which the air pressure is produced usually by suction applied to the back or opposite face of the units;

Fig. 3 is a vertical section taken on the line 3—3 of Fig. 1;

Fig. 4 is a fragmentary section taken on the line 4—4 of Fig. 1; and

Fig. 5 is a fragmentary perspective showing one end portion of the lock bar of the units.

The filtering units here illustrated comprise a marginal frame, a filtering media and a lock bar. The marginal frame 6 illustrated is a rectangular structure and the filtering media is a deeply corrugated element preferably formed of a sheet of cotton 7 held between reticulate reinforcing and stiffening elements such as fine light wire screens 8, but possibly of any open and relatively stiff material which will serve to hold the cotton sheet in the corrugated shape given thereto without impeding, to any appreciable extent, the free flow of the air. To give a maximum of dust or impurity intercepting surface and a minimum resistance to the flow of air, and hence high filtering efficiency, the corrugations of the filtering element are made V-shaped, are given very considerable depth and are quite closely spaced.

The filter described is of a size to fit snugly within the rectangular frame 6 and at one face the frame 6 is formed with inturned side, top and bottom stop flanges 9 against which the filter will be seated, as best shown in Fig. 3, when in position. The filter described has considerable self-sustaining action, but not enough to hold it definitely in working position unless pressed inward or forward against the flanges 9; and hence I provide a lock bar 10. This lock bar might take various forms, but as shown, is made from a light piece of angle iron with projecting ends equipped with lugs or knobs 11 which when the bar is in position as shown in Figs. 1 and 3 engage and interlock with seats in upper and lower flanges or projections 12, formed on what, in the drawings, is shown as the top and bottom of the frame 6. When this bar 10 is in position as shown it presses the rear portions of the corrugations of the filtering element forward with the front portions and the edges of the corrugations against the flanges 9. The application of this bar 10 not only locks the filtering element in the frame but, by the pressure produced on its corrugations keeps the corrugated filtering element expanded to full dimension to fit this frame and, moreover, reinforces intermediate portions of the corrugations against rearward bulging under air pressure produced by the air drawn or forced through the filter.

With the arrangement described it has been found that the reinforcing elements 8, for a filtering material, may be made of very fine or light wire or other very light reticulate reinforcing material.

In the preferred form of this air filter it is primarily intended that the frame and bar and the reinforcing screens 8 may be used over and over again, while the cotton sheets or other filtering media proper, when clogged with intercepted dust or materials will be thrown away and replaced. However, all of the elements of the filtering units may be made of such combustible materials.

It is important to note that cotton or other filtering medium 7 overlaps to some extent the reinforcing screen 8, see Fig. 1. Thus, the filtering medium as a whole fits snugly against the sides and the frame 6 prevents any air escaping at the sides.

From the foregoing it is thought to be evident that while the corrugated filtering element when unsupported will, under very light pressure, be collapsed transversely of its corrugations, that when it is placed in the frame under pressure toward the flanges 9 and lock bar 10, the corrugations will diverge and cannot collapse because a collapsing movement would require movement of the converging surfaces toward each other, and such action is resisted and prevented by the pressure under which the corrugations are confined.

Also, attention is called to the fact, see Fig. 4, that the cotton sheets or filtering media proper at its edges projects beyond the reinforcing screens so that when the filtering element is placed in the frame, the projecting edges of the cotton sheets are tightly forced against the frame and "upset" so as to form air tight joints. In the preferred form of the filter the flanges frame 6 and the lock bar 10 are preferably made from light sheet metal such as sheet steel, but as indicated may be formed from other materials. These filtering units are frequently assembled to form a large filter made up of multiplicity of such elements; and hence for that purpose the frame 6 will usually be covered with a layer of felt 6a which when a number of the elements are placed with a receiving masterframe will form air tight joints therewith. A preferred and commercial form of the filter is illustrated in the drawings and has been above described more or less in detail, but it will be understood that the said filter is capable of modifications as to details of construction and arrangement of parts, within the scope of the invention herein broadly disclosed and claimed.

What I claim is:

1. In a filtering unit comprising a marginal frame having vertical stop flanges at its front and upper and lower stop flanges in back, a corrugated screen covered filtering medium seated against the vertical front flanges of said frame with its edges tightly engaging the vertical members of said frame, and a detachable lock-bar having ends interlapped with the top and bottom back flanges of said frame and engaging the back intermediate portions of the corrugations of said filtering medium and holding the latter seated under pressure so that the upper and lower edges of said filtering medium will be pressed against the top and bottom members of said frame.

2. The structure defined in claim 1 in which the ends of said lock-bar are interlocked against movement in the plane of the back edges of the corrugations of said filtering medium.

CHARLES CHRISTOFFERSON.